March 26, 1968  R. H. ROMNEY  3,374,548
STEREOTAXIC SYSTEM
Filed March 23, 1965  2 Sheets-Sheet 2

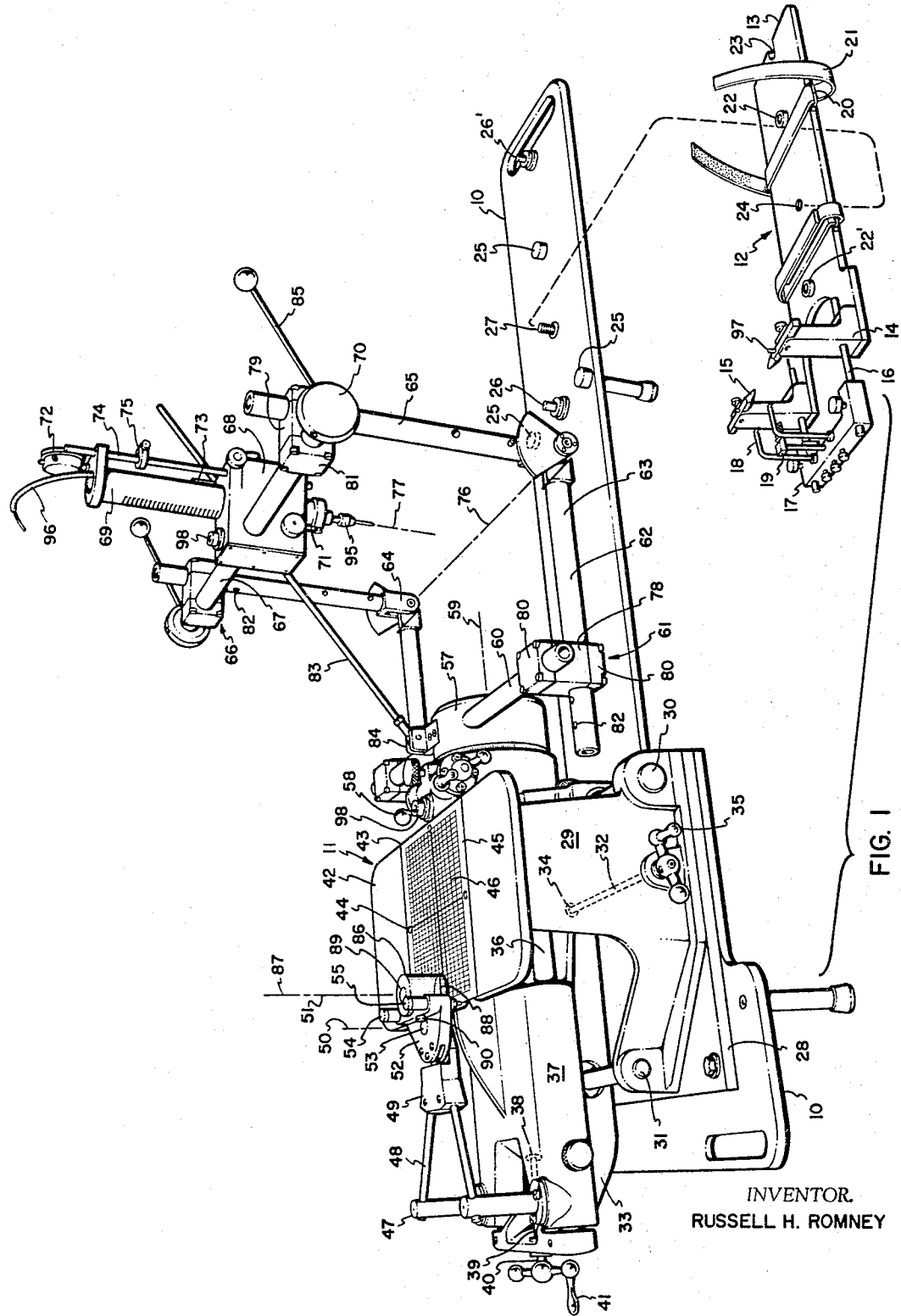
FIG. I
INVENTOR.
RUSSELL H. ROMNEY

INVENTOR.
RUSSELL H. ROMNEY 3,374,548
STEREOTAXIC SYSTEM
Russell H. Romney, 3259 Bon View Drive,
Salt Lake City, Utah 84109
Filed Mar. 23, 1965, Ser. No. 441,970
14 Claims. (Cl. 33—174)

ABSTRACT OF THE DISCLOSURE

A stereotaxic system including an instrument positionable in any orientation relative to and for use upon a subject which is secured to a stage, that may be situated upon the stereotaxic base in any one of a plurality of useful orientations and removed when desired from the base to facilitate securing the subject thereon or to reorient the subject relative to the instrument. Comparator structure associated with the instrument for joint movement with the instrument so that displacement of comparator components, such as in response to following of a graphic representation of the subject, will cause duplicate displacement of the instrument.

---

This invention relates to systems which facilitate diverse mechanical manipulations on a wide variety of animate and inanimate subject matter. It is primarily concerned with providing systems which facilitate diverse surgical manipulations on anterior portions of a wide variety of animals used for research in the life sciences. This invention is especially concerned with embodiments thereof which include diverse comparator means; said comparator means enabling said surgical manipulations to be controlled nad interpreted in terms of mensurative standards and analagous forms of said manipulations, respectively, are included in said embodiments.

A primary object of this invention is to provide a stereotaxic system enabling maximal correlation between given subject matter (animate or inanimate) and mechanical manipulations thereof, such correlation yielding results of the highest precision while reducing the probability of operator error.

Another object of this invention is to provide a stereotaxic system characterized by maximal versatility both as to types of subject matter and manipulations thereon.

Relative to its primarily intended usage, the principal object of this invention is to provide a multi-specie stereotaxic system by means of which the above-cited objects, as applied to pertinent research in the life sciences, are relatively easily achievable.

An operative example of the best mode devised for carrying out this invention as applied to its primarily intended usage is disclosed herein. Although this example is of mechanical nature, the essential novelty of this invention admits of diverse embodiments thereof, including embodiments which are largely of electronic nature.

Other objects and advantages of this invention will be readily apparent from the ensuing disclosure which is best understood with reference to the accompanying drawings, in which:

FIGURE 1 is a perspective view of an exemplary embodiment of the invention showing the animal stage in exploded relation therewith; the display films and implement adaptors normally associated with said embodiment being omitted therefrom for clarity.

Figure 3:
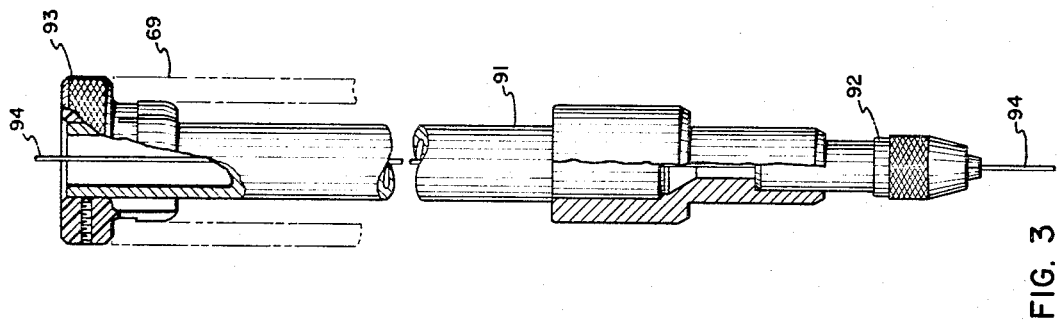
FIGURE 3 is a longitudinal elevation of a typical emplement adaptor which is usable but not shown in the exemplary embodiment of FIGURE 1; certain internal portions of said adapter being revealed by broken-out section.

Referring to the figures in detail, an over-all concept of the system is best obtained by reference to FIGURE 1, showing a platform base 10 with the stereotaxic instrument 11 secured thereto. The animal stage 12 is somewhat removed from the base 10 in exploded fashion, so that certain details of the base, hereinafter described, are revealed. The animal tray consists essentially of a flat base 13 to which are attached a pair of ear-bar supports 14. A pair of ear bars 15 are adjustably retained by said supports 14 and a pair of rods 16 extend from the respective bases of the supports 14. A carriage 17 is slidably mounted on the rods 16 and carries a pair of orbital clamps 18 and a mouth piece 19. Two pairs of strap holders 20 enable a pair of canvas straps 21 to be attached to the base 13. A commercially available closure sold under the trademark Velcro is sewn to each of the straps 21; said closure providing optimal adaptibility to accommodate a wide variety of sizes of animals, while also obviating the need of buckles and the like. The flat base 13 carries a pair of hardened bushings 22 and 22' and is also provided with a slot 23 and a threaded hole 24. Referring now to the platform base 10, three identical bosses 25 are attached thereto, providing three-point support for the animal stage which is normally placed thereon. A pair of locating pins 26 and 26' are attached to the platform base 10. Also carried by the platform base 10 is a captive screw 27 by means of which the stage 12 is fastenable to the platform base 10.

Prior to using the system, the research animal (for the exemplary embodiment of this disclosure, a house cat) is fully anesthetized so that it is incapable of feeling pain. The animal stage 12 is then secured to the platform base 10 so that the bushing 22 engages the locating pin 26. The captive screw 27 is then brought into firm threaded engagement with the threaded hole 24, thus firmly securing the stage 12 to the platform base 10 so that the anterior portion of the animal stage 12 is relatively removed from possible interferance with the stereotaxic instrument 11 during preparatory surgery. With the stage 12 in this position, the anesthetized animal is secured to the flat base 13 by means of the straps 21. The cat's head is then placed between the ear-bar supports 14 and the ear-bars 15 are firmly inserted into the animal's ears. The carriage 17 and its orbital clamps 18 and mouthpiece 19 are then adjusted so that the respective orbital clamps 18 rest on the lower orbital ridge of the cat's eye-sockets while the mouthpiece 19 is adjusted to push gently upward on the cat's upper jaw.

The animal is now ready so that the surgical procedures may commence. Initially a scalp incision is made, thereby exposing the animal's skull. The captive screw 27 is then disengaged and the animal stage 12, with the cat attached thereto, is repositioned on the base 10 so that the animal's head is facing towards the stereotaxis instrument, the bushing 22' engaging the locating pin 26. The captive screw 27 is then reengaged in the hole 24, at which time the stereotaxic manipulations may proceed.

The stereotaxic instrument has a base 28 to which are attached a pair of upright castings 29. A front journal rod 30 and a rear journal rod 31 interconnect the upright castings 29 which are also interconnected by a lateral drive screw 32. A foundation casting 33 is slidably mounted on the front and rear journal rods 30 and 31, respectively. A lateral nut 34 is firmly attached to the foundation casting 33 and is in threaded engagement with the lateral drive screw 32. Lateral crank handles 35 mounted on the extremities of the lateral drive screw 32 enable the lateral drive screw 32 to be manually rotated, thereby positioning the foundation casting 33 mounted on the front and rear journal rods 30 and 31, respectively. The foundation casting 33 carries a pair of longitudinal journal rods 36 which are mutually spaced apart and parallel. A traveling casting 37 is slidably mounted on the longitudinal rods 36. A longitudinal nut 38 is firmly attached to the traveling casting 37 and is in threaded engagement with a longitudinal drive screw 39; the rearward extremity 40 of the longitudinal drive screw 39 being rotationally secured to the traveling casting 37 and carrying a longitudinal crank handle 41. By manually turning the longitudinal crank handle 41, the traveling casting 37 is positioned on the longitudinal journal rods 36. An analogue plate 42 is secured to the upright castings 29 and is provided with a depression 43 in which are fixed a pair of locating pins 44. A mensurative standard 45, in the form of a square flat plate, is disposed in the depression 43 and is provided with a millimetric coordinate system 46 on its top surface. The periphery of the mensurative standard 45 carries four holes which are symmetrically placed so that the mensurative standard 45 may be positioned on the pins 44 in four different positions with respect to the analogue plate 42. These four different positions result in certain advantages which are hereinafter explained. Secured to the traveling casting 37 is a pair of posts 47 to which are secured a pair of rods 48 which in turn support a turret base 49. The turret base 49 has a rotation axis 50 and an index axis 51. A turret 52 is firmly but rotatably attached to the base 49 by means of a pivot pin 53 whose central axis is coincident with the rotation axis 50. The turret 52 and the turret base 49 conjointly carry mechanical detent means which enable the turret to be manually positioned in any one of three separate rotational positions with respect to the base 49. A ruling pen 54 and an encircling pen 55, respectively, are carried by the turret 52 so that their respective writing axes are parallel with respect to said rotation axis 50. Each of the pens 54 and 55 is spring mounted in the turret 52 so that they are normally urged upward and out of writing contact with the mensurative standards 45 or items which are described hereinafter as being superimposable on the mensurative standards.

Figure 2:
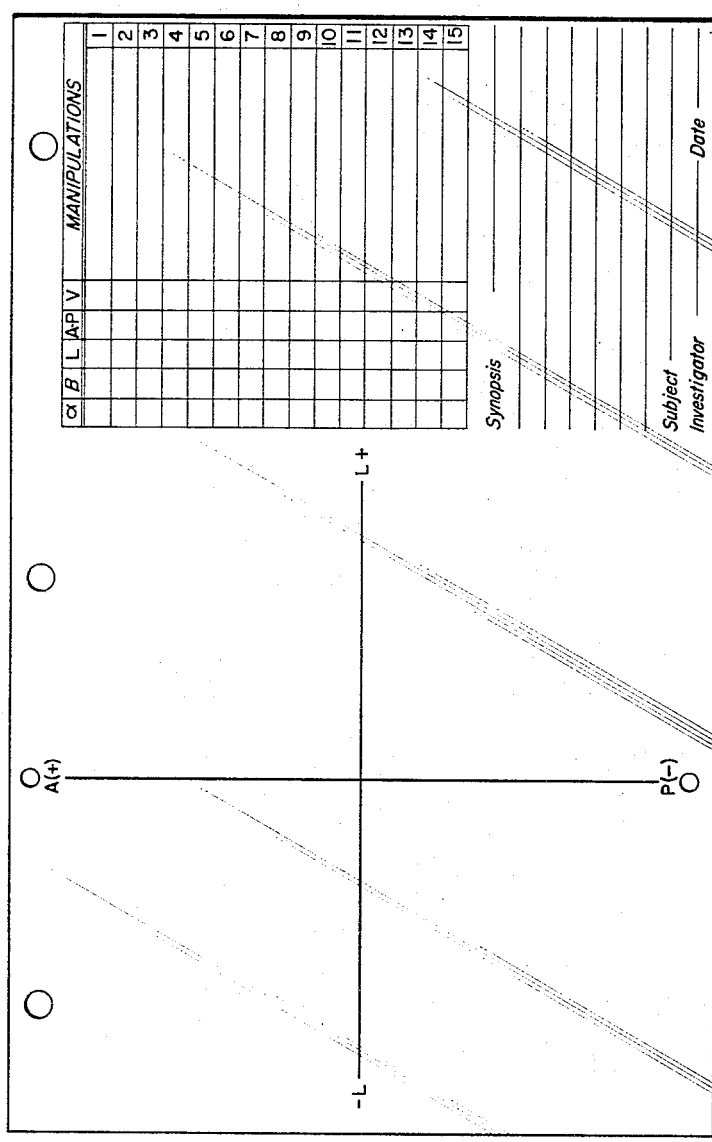
FIGURE 2 is a plan view of a typical display film which is usable but not shown in the exemplary embodiment of FIGURE 1.

FIGURE 2 discloses a typical display film 56 which is transparent and flexible and which is provided with a typical format shown by FIGURE 2. In the ordinary usuage of this system, certain features of the cat's cranial anatomy are graphically transcribed upon the display film 56. The target loci of the surgical procedures to be performed are then properly marked upon the display film 56, which is then secured to the analogue plate 42 by means of adhesive tape (not shown).

At this point, it is well to describe certain other aspects of the stereotaxic instrument before completing our description with regard to the display film, etc. The traveling casting 37 carries a support head 57 which is rotatably mounted thereon. A pair of rotating cranks 58 and associated worm drive (not shown) enable the support head 57 to be rotationally positioned about a longitudinal axis 59. A primary tube 60 is firmly attached to the support head 57. A pair of connection blocks 61 interconnect the primary tube 60 with a pair of mutually identical secondary tubes 62. The forward ends 63 of the secondary tubes 62 carry hinge joints 64. The hinge joints 64 interconnect the primary tube 60 with a pair of mutually identical tertiary tubes 65. A second pair of connection blocks 66 connect the tertiary tubes 65 to a pair of mutually identical quill support tubes 67. The quill support tubes 67 are immovably attached to a quill block 68. A quill 69 is carried by the quill block 68; said quill being in slideable securement therewith. Quill knobs 70 are interconnected by a drive shaft (not shown) which carries a pinion (not shown); said pinion being mounted within the quill block 68 and engaging a rack cut in the quill 69 so that manual rotation of either of said quill knobs 70 will cause the quill 69 to reciprocally slide with respect to the quill block 68.

The present inventon incorporates a unique type of quill retraction spring 71 sold under the trade name Negator. The Negator 71 is a relatively constant force spring which is attached directly to the quill 69, thereby counter-balancing said quill and preventing inadvertent dropping of the quill while providing a relative constant retraction force or "feel" regardless of the position of the quill 69 with respect to its quill block 68. A dial indicator 72 is carried by the quill 69 and a stop rod is adjustably carried by the quill block 68. The dial indicator 72 working against the stop rod 73 accurately discloses the quill's motion with respect to its quill block. Also carried by the quill block 68 is a scale 74 which also discloses the quill's position. A stop 75 is adjustably carried by the scale 74 and enables the quill's downward motion to be limited at any desired point. The hinge joints 64 have a rotation axis 76 which is coplanar with respect to the traveling castings longitudinal axis 59; axes 59 and 76 being mutually orthogonal.

The platform base 10 serves as a locating means which assures that when the index axis 51 is pointing toward a target point graphically shown on the display film 56, the quill's longitudinal axis 77 is directed toward the corresponding target in the animal's head. The connection blocks 61 and 66, respectively, are individually composed of three separate parts; namely, a central body 78 and 79, respectively, and end caps 80 and 81 respectively, each of these central bodies 78 and 79 carries a dowel pin (not shown); the extremities of said dowel pin snugly engaging adjustment holes 82 in the tubes 60, 62, 65, and 67. These connection blocks and their mating holes enable the stereotaxic instrument to be altered somewhat in size and configuration as required to accommodate diverse subject matter. A brace rod 83 having one end secured in a bracket 84 is adjustably secured to the quill block 68 and enables the quill 69 to be rotationally positioned about axis 76.

By way of summarizing the various motion capabilities possessed by the stereotaxic instrument of the present invention, we may state that said instrument 11 is capable of imparting five mutually distinct and separate motions to the quill 69. The first of these motion capabilities enables the quill to be reciprocally moved with respect to the quill block 68 by means of the quill knobs 70 or quill handles 85. The second of these motion capabilities enables the quill 69 to be moved anteriorly-posteriorly with respect to the animal by means of the longitudinal crank handle 41. The third of these motion capabilities enables the quill to be laterally moved with respect to the animal by means of either of the lateral crank handles 35. The fourth of these motion capabilities enables the quill 69 to be rotated about the longitudinal axis 59 by means of either of the rotating cranks 58. The fifth of these motion capabilities enables the quill to be rotated about the rotation axis 76.

It will be readily apparent to persons of ordinary skill in the art to which the exemplary embodiment of FIGURE 1 is directed that the platform base 10 could be replaced with any one of a variety of means which accurately position the instrument 11 with respect to the animal stage 12; one of such means being an ambulatory table (not shown) which is constructed so that it will permit full 360° revolution of the support head 57 about the longitudinal axis 59. All embodiments of the invention of the general type illustrated by FIGURE 1 are designed and constructed so that when the index axis 51 is directly over the center of the mensurative standard 45, the quill's longitudinal axis 77 will intersect a point in the cat's head which lies in the cranial medial plane and is exactly 1 centimeter above the cat's interaural axis.

Returning to our discussion of the display film 56, etc., attention is here called to some of the advantages deriving therefrom. The fact that the film 56 is transparent enables easy transcription thereon of anatomical illustrations found in diverse literature. Also, information displayed on the transparent film 56 is relatively easy to reproduce by a number of standard processes. Although a number of materials are usable, extraordinary dimensional stability and "tear resistance" are obtainable by selecting materials such as Mylar. The display film 56 illustrated by FIGURE 2 lends a certain amount of uniformity to stereotaxic data; such uniformity resulting in increased efficiency as well as reduction of human error.

An optical viewer 86 is adjustably carried by the turret 52 so that its optical axis 87 is coincident with index axis 51 when the turret occupies its second position, as shown in FIGURE 1. The viewer 86 shown in FIGURE 1 is provided with a cross-hair reticle on the bottom thereof. A convex central portion 89 is made integral with the top surface of the viewer 86, thereby providing the viewer with an optical magnifying power of approximately 5. Loosening of the thumb screw 90 enables the optical viewer 86 to be adjusted vertically for the proper focus. The turret base 49 and turret 52, respectively, are designed and constructed so that either of the pens 54 or 55 or the optical viewer 86 are positionable so that their respective longitudinal axes are serially positionable coincident with said index axis 51. It is apparent that the pens 54 and 55, and the optical viewer 86 and their associated turret 52 and turret base 49 provide the researcher with diverse capabilities heretofore unknown in any one system of instrument of which I am aware. By way of example, the encircling pen is a highly convenient and accurate means for marking target loci on the display film 56. Furthermore, the ruling pen 54, when depressed and locked in writing contact with the display film 56, enables anatomical features of the subject animal to be directly traced thereon.

Reference was previously made to the fact that the mensurative standard 45 is positionable on the analogue plate 42 in any of four different positions. This multi-position capability provides the researcher with convenience as well as versatility in the handling of diverse subject matter. The system disclosed herein includes diverse implements which are carryable by the quill 69, as adapted by the implement adaptor 91 illustrated by FIGURE 3. The exemplary adaptor 91 includes a chuck 92 and a stabilizing collar 93. The chuck 92 is capable of retaining a wire electrode 94. The stabilizing collar 93 lends stability to the implement adaptor 91 when said adaptor is carried by the quill 69. FIGURE 1 illustrates another common implement carried by the quill; namely, the hand piece 95 of a flexible shaft drilling unit (not shown). In FIGURE 1, a drill bit 96 is carried by the hand piece 95 and, when powered by a flexible shaft 96, enables holes to be drilled in the animal's skull as required.

Vertical reference bosses 97 carried by the ear bars 15 facilitate determination of the vertical position of a given implement brought into contact therewith.

Circular spirit levels 98 facilitate leveling and adjusting of the stereotaxic instrument 11.

Due to the fact that the spirit and scope of this invention admits of a great variety of apparently widely different embodiments thereof, it is to be understood that this invention is not restricted to specific embodiment thereof, except as defined in the appended claims.

I claim:

1. In a stereotaxic apparatus for use on a predetermined subject comprising in combination structure means for supporting and selectively positioning an instrument comprising locating means for selectively situating the instrument at any one of a number of incremental locations along a longitudinal axis of the apparatus, second locating means for selectively situating the instrument at any one of a number of incremental loactions along an axis normal to the longitudinal axis, third locating means for situating the instrument in any one of a number of incremental essentially radial locations around a selected point on the mentioned longitudinal axis and fourth locating means for situating the instrument in any one of a number of incremental essentially radial locations around a selected point on the mentioned normal axis, said structure means further comprising means for reciprocally displacing the instrument toward and away from the selected point on at least one of the two axes, display means to present a graphic representation of at least part of the subject, indicator means disposed adjacent the display means and means connecting said structure means and said indicator means such that the structure and indicator means may be displaced in unison along the longitudinal and transverse axes whereby identical patterns are traced by the instrument and by an indicating portion of the indicator means respectively so that (a) when the indicating portion is caused to move in accordance with the graphic representation, the instrument will correspondingly move relative to the subject and (b) when the instrument is caused to transversely or longitudinally move in accordance with the configuration of the subject a graphic representation of such movement may be recorded by the indicator means.

2. In a stereotaxic apparatus as defined in claim 1, comprising stationary base means, stationary plate means carried by said base means essentially parallel thereto and comprising at least part of the display means such that there is no relative movement between the base means and the plate means, and means also comprising at least part of the display means and adapted to be secured in fixed relation upon the stationary plate means to exhibit graphical indicia representative of the physical configuration of the subject.

3. In a stereotaxic system as defined in claim 1 wherein said indicator means comprises:

an analogue plate fixed to a stationary base such that there is no relative movement therebetween, the analogue plate being elevated to dispose a first surface of the analogue plate near the indicating portion of said indicator means;

a mensurative standard displayed on the first surface of the analogue plate exhibiting visible indicia representing a known measurement scale;

display means secureable upon the mensurative standard in any one of a variety of positions;

a rotatable turret suspended by bars to selectively extend over the analogue plate and the secured display means in spaced relation thereto, said suspension bars being integrally associated with the structure means whereby movement of the turret relative to the analogue plate results in corresponding displacement of the structure means;

an optical viewer and at least one marking instrument joined to the turret and selectively positionable over the display means by rotation of the turret to accommodate identification of specific locations on the display means which correspond to locations of the instrument relative to the subject.

4. In a stereotaxic system as defined in claim 1 wherein said structure means comprises:

a support head rotatably mounted on a travel casting which is integral with said indicating portion of the indicator means, the support head being selectively positionable in essentially any one of many possible orientations around the longitudinal axis thereof, at least two identical and opposed support arms immovably fixed and laterally projecting from the support head and rotatable therewith, longitudinally projecting rods, one adjustably connected by a connection block to each lateral support arm in an essentially perpendicular relation so that the effective length of the arms and rods respectively may be selectively varied to suitably size the structure means for use upon a predetermined subject, said longitudinally projecting rods each being pivotably united to an upstanding tube which is selectively positionable at various radial angles with respect to the axis of the pivotable union, and opposed quill support tubes respectively secured at one end by connection blocks to the terminal end portion of the adjacent upstanding tube and at the opposite end to a central quill block which supports the quill-retained instrument.

5. In a stereotaxic apparatus as defined in claim 1 wherein said displacing means comprises a reciprocally displaceable quill adaptable to receive an implement for selectively displacing said implement toward and away from the intersection of the longitudinal and transverse axes in essentially any radial direction.

6. In a stereotaxic system,
a base and displaceable support structure for carrying and accommodating manipulation of an instrument,
comparator means carried by the base and comprising displaceable indicator means associated with the support structure for joint movement, and stationary display means,
said indicator means comprising a turret base which carries a rotatable turret in any selected one of several positions,
indicating instruments carried by the turret and comprising means for marking selected portions of the display means and a viewer for observing selected portions of the display means,
said display means comprising (a) a substantially flat mensurative standard supported by the base and (b) an exposed display surface.

7. In a system as defined in claim 6 wherein said viewer comprises magnification and reticle means for reading the display surface, wherein said marking means comprises a ruling pen and an encircling pen, each of said pens being biased by resilient means and being individually operable when urged and retained in writing contact with the display surface counter to the bias force of the resilient means.

8. In a stereotaxic system as defined in claim 6 wherein said display surface comprises a flexible film which is at least partially transparent to expose at least a portion of said mensurative standard to view.

9. In a stereotaxic system as defined in claim 6 wherein said display surface comprises part of a sheet of paper and the visible surface of the mensurative standard comprises a grid network.

10. In a stereotaxic system as defined in claim 6 further comprising a substantially flat plate adapted to be removably superimposed on the base in any one of a plurality of positions relative to the base, each said position being substantially parallel to the longitudinal axis of the base.

11. In a stereotaxic system as defined in claim 6 wherein said support structure comprises a plurality of relatively adjustable connection blocks through which bars pass, whereby the effective size and configuration of the support structure is adjustable to accommodate subjects of various sizes and shapes.

12. In a stereotaxic system as defined in claim 6 including a quill block interposed between the support structure and the instrument, said quill block having an aperture therethrough with an instrument-carrying reciprocable quill snugly but slideably disposed in and extending from the aperture; and bias means associated with the quill and quill block which urge the quill and the instrument toward the retracted positions.

13. In a stereotaxic system as defined in claim 12 further comprising a dial indicator carried by the quill and an adjustable stop means carried by the quill block such that the dial indicator and the stop means conjointly accommodate measurement of the reciprocal displacement of the quill.

14. In a stereotaxic system as defined in claim 12 wherein said quill comprises adaptor structure so that any one of a plurality of instruments can be operatively coupled to the quill at any given time.

References Cited

UNITED STATES PATENTS

| 3,061,936 | 11/1962 | De Bobbeleer | 33—174 |
| 3,073,310 | 1/1963 | Mocarski | 33—174 |
| 3,135,263 | 6/1964 | Connelley | 33—174 |
| 3,223,087 | 12/1965 | Uladyka | 33—174 |
| 3,238,624 | 3/1966 | McCabe | 33—23 |
| 3,267,575 | 8/1966 | Beard | 33—23 |
| 2,305,167 | 12/1942 | Kasper | 33—23 |

FOREIGN PATENTS 629,119  12/1961  Italy.

SAMUEL S. MATTHEWS, *Primary Examiner.*